United States Patent
König et al.

[11] Patent Number: 5,810,892
[45] Date of Patent: Sep. 22, 1998

[54] METHOD AND APPARATUS FOR PURIFYING CHEMICAL SUBSTANCES

[75] Inventors: Axel König, Stuttgart; Joachim Ulrich, Bremen, both of Germany

[73] Assignee: Santrade Ltd., Lucerne, Switzerland

[21] Appl. No.: 581,594

[22] PCT Filed: Apr. 20, 1995

[86] PCT No.: PCT/EP95/01497

§ 371 Date: Mar. 14, 1996

§ 102(e) Date: Mar. 14, 1996

[87] PCT Pub. No.: WO95/30478

PCT Pub. Date: Nov. 16, 1995

[30] Foreign Application Priority Data

May 5, 1994 [DE] Germany ................ 44 15 845.9

[51] Int. Cl.[6] .................... B01D 9/02; C07C 7/14
[52] U.S. Cl. ............. 23/295 R; 23/313 R; 585/812; 585/813
[58] Field of Search .............. 23/313 R, 293 R, 23/295 R; 585/812, 813, 815, 834, 837, 838

[56] References Cited

U.S. PATENT DOCUMENTS

| | | | |
|---|---|---|---|
| 2,321,117 | 1/1943 | Wilcock | 585/815 |
| 2,884,471 | 4/1959 | Leston et al. | 585/813 |
| 3,272,893 | 9/1966 | Mogensen | 264/8 |
| 5,013,498 | 5/1991 | Froeschke | 264/8 |
| 5,149,445 | 9/1992 | Schermutzki et al. | 210/773 |

FOREIGN PATENT DOCUMENTS 28 53 054  9/1982  Germany.

*Primary Examiner*—Gary P. Straub
*Attorney, Agent, or Firm*—Burns, Doane, Swecker & Mathis, L.L.P.

[57] ABSTRACT

After being subjected to a melt crystallization operation, a crystal-containing melt is formed into particles of the same size and shape and then conducted in counter-flow relationship to washing liquid in a washing column. The crystal-containing melt can be formed into particles by a device which deposits the crystal-containing melt as identically sized drops onto a cooling belt. The particles can be completely hardened or only partially hardened when entering the washing column.

6 Claims, 2 Drawing Sheets

METHOD AND APPARATUS FOR PURIFYING CHEMICAL SUBSTANCES

Background of the Invention

The invention relates to a method and an apparatus for purifying chemical substances that are initially molten, crystallize out with heat absorption, and after being conveyed through a washing column can be removed as a purified product.

It is a known method in which the crystals are formed, and then washed in to utilize "melt crystallization" to "washing columns" to remove the residual molten substance adhering to the crystals, in order then to obtain purified crystals which can then be melted. The wash columns provided in such melt crystallization (BIWIC 1990—Bremen International Workshop for Industrial Crystallization, Sep. 12–13, 1990 in Bremen) basically operate satisfactorily. Their action is impaired, however, by the fact that they are supplied, for example, with crystalline particles in the form of a crystal slurry from scrape chillers. The size distribution of the crystalline particles produced in the scrape chillers is very broad, and the shape of the particles is not uniform. There are also numerous agglomerates. Separation of the particles is therefore greatly reduced by the residual melt, enriched in contaminants, that adheres to these particles. Because of the nonuniform particle shapes, the washing columns, in which flow occurs around the particles, are overtaxed. Methods for purifying chemical substances have already been disclosed (DE 40 41 669 C1and corresponding to U.S. Pat. No. 5,149,455) in which molten substances were first made into drops and allowed to solidify into tablets. In these known methods, however, the tablets are not washed in washing columns, but rather are subjected to a sweating operation in a hot gas stream; the temperature of the hot gas stream and its flow velocity being matched to the size and properties of the tablets so that the tablets, lying on a permeable conveyor support surface, are subjected to the sweating operation only in the region of that conveyor support surface, so that the melting tablet surfaces drip through the permeable support surfaces and the remaining tablets are carried off perpendicular to the drip direction.

The underlying object of the invention is therefore to propose a method and an apparatus with which the output of washing columns in melt crystallization systems can be improved.

SUMMARY OF THE INVENTION

Proceeding from the consideration that this object can only be achieved if the most uniform possible charging of the washing columns, with reference to the suspension, is provided, the invention consists in the fact that at least a part of the chemical substances is brought, after melting, into the form of monodispersed particles; and that those particles are then used to supply the washing column, together with molten substance or also without it.

With this procedure the washing columns can be supplied with practically monodispersed particles of adjustable and adequate size, which produces the critical advantage that a highly uniform flow around all particles takes place, and thus also an intensive and much more efficient purification. In a development of the invention, it is preferable if the particles are not completely solidified, meaning, for example, as a rule are solid only on the outside but on the inside are not completely consolidated before they are delivered to the washing column. The result is to produce good mass separation for the subsequent purification. Specifically, the desired mass separation or mass exchange that leads to purification takes place while the particles are being moved in the column on the basis of density difference and/or positive conveyance. Washing columns can operate very effectively in this manner and production can be increased, and not only in the conventional sense for separating out the adhering residual molten substance, but also in order to ensure actual separation and the best possible purification and removal of residues.

To implement the new method, an apparatus that is characterized by a granulating device, downstream from a melting apparatus and upstream from a washing column, to generate the monodispersed particles has proven particularly simple. It has proven to be particularly advantageous and simple to use "rotoformers," which are the subject of German patent 28 53 054 and are manufactured and marketed by Sandvik Process System in Fellbach near Stuttgart, as the granulating device.

BRIEF DESCRIPTION OF THE DRAWINGS

The invention is depicted in the drawings with reference to exemplary embodiments and will be explained below. In the drawings.

DETAILED DESCRIPTION OF PREFERRED EMBODIMENTS OF THE INVENTION

Figure 1:
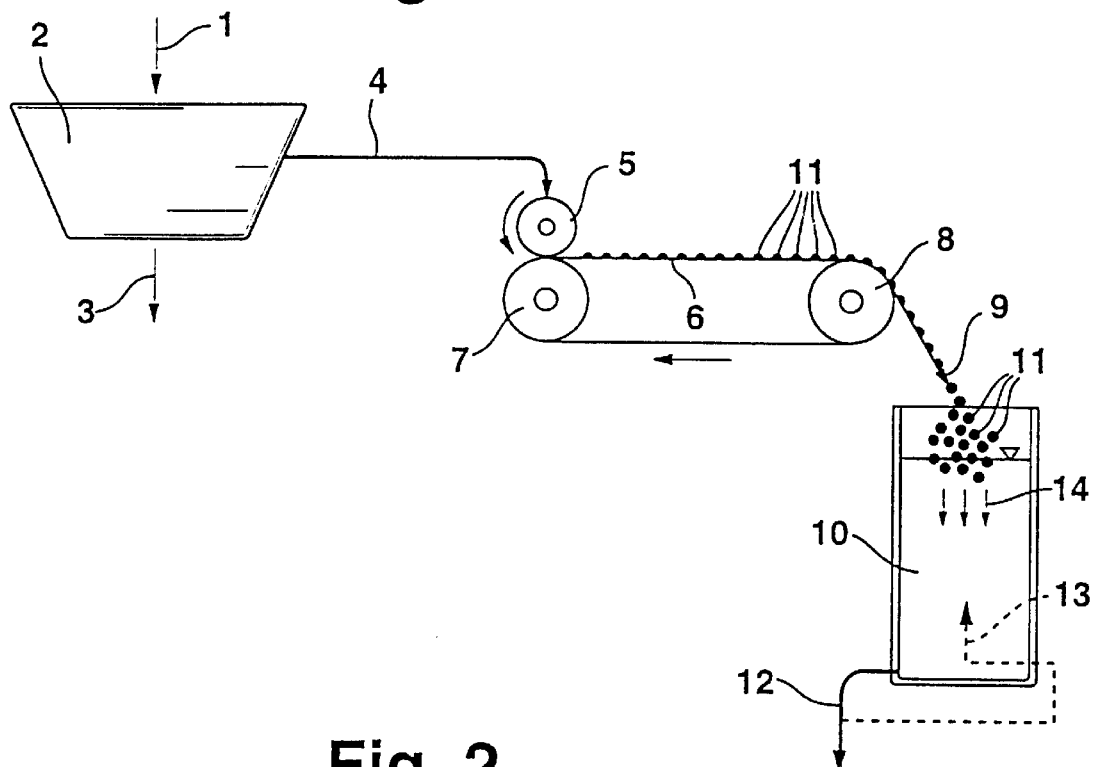
FIG. 1 shows a schematic depiction of a apparatus for purifying a meltable substance that can be crystallized out.

FIG. 1 shows a device in which a molten chemical substance is delivered in the direction of the arrow (1) to a filter apparatus (2), from which the filtrate is removed in the direction of the arrow (3). The molten substance, which in a known manner is provided with crystal seeds and crystals, is removed from the filter (2) through a conduit (4), and delivered to a granulating device (5) that in the exemplary embodiment is configured in the form of a "rotoformer," in which the substance is introduced axially into a stationary inner tube provided on the underside with a slit, and is discharged downward through openings provided on the circumference of an outer rotating tube onto a cooling belt (6). Because the openings each cyclically come into registration, the substance is discharged as drops and consolidates on the cooling belt (6), which is guided over two reversing rollers (7 and 8), to the extent that at the end of the cooling belt (6) it can be delivered in the direction of the arrow (9) to a washing column (10) known in the art.

The drops discharged from the apparatus (5) onto the cooling belt (6), tablet-shaped particles (11), which all have the same size and therefore can be referred to as monodispersed. These tablets (11) therefore constitute defined particles in the washing column, which in contrast to the scraped crystals of known devices do not tend to clump or agglomerate. The tablets (11) then sink down inside the washing column (10) in the washing liquid, either because of a density difference or because of positive conveyance. In the process they move in countercurrent to the washing liquid, which for example can consist of a purified molten substance removed from the end of the washing column through the line (12). This washing liquid flows in the direction of the arrow (13) against the movement direction (14) of the tablets (11).

Coverage of the individual tablets (11) is therefore very good, and uniform action of the washing liquid on all particles also takes place. The result is better yield and also a purer product. The apparatus also operates with greater energy efficiency with washing columns according to the prior art.

Figure 2:
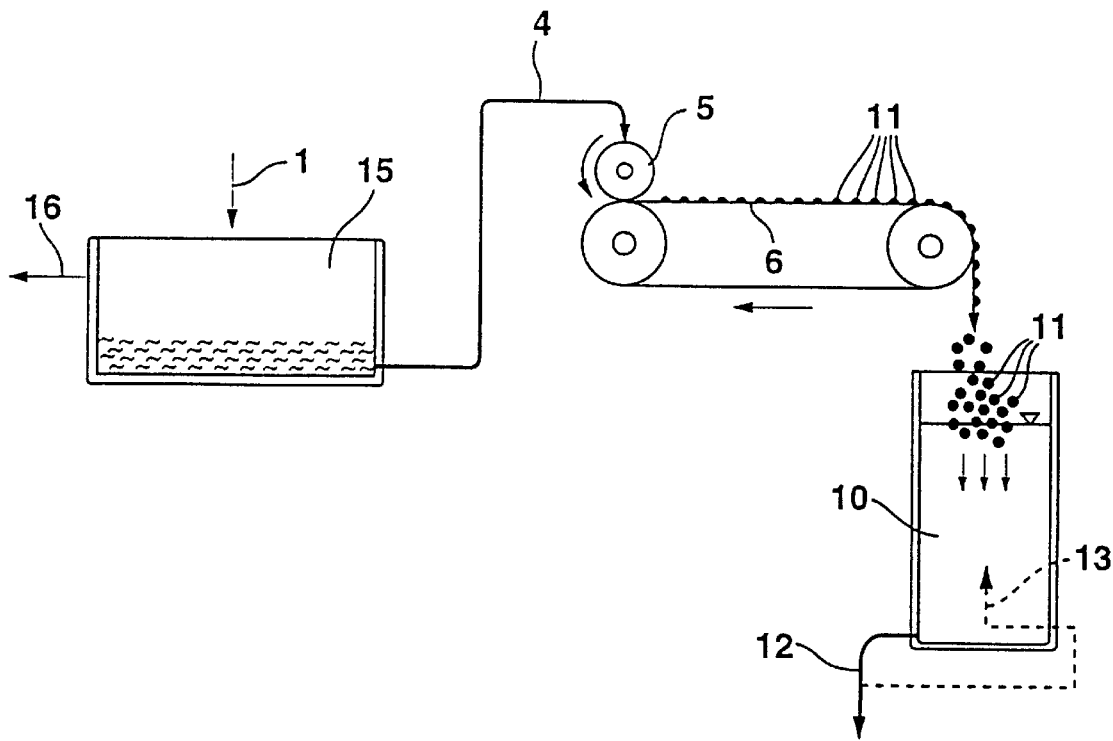
FIG. 2 shows a schematic depiction of an apparatus similar to FIG. 1, but in which the substance for further processing is prepared in a different way.

The apparatus shown in FIG. 2, which also operates in accordance with the method according to the invention, differs from the device of FIG. 1 only in that the molten substance, enriched with crystals, that is delivered to the rotoformer (5) is formed, in a conventional manner, by sedimentation in a vessel (15) that is provided with an overflow (16). The embodiment otherwise corresponds to that of the device of FIG. 1.

Figure 3:
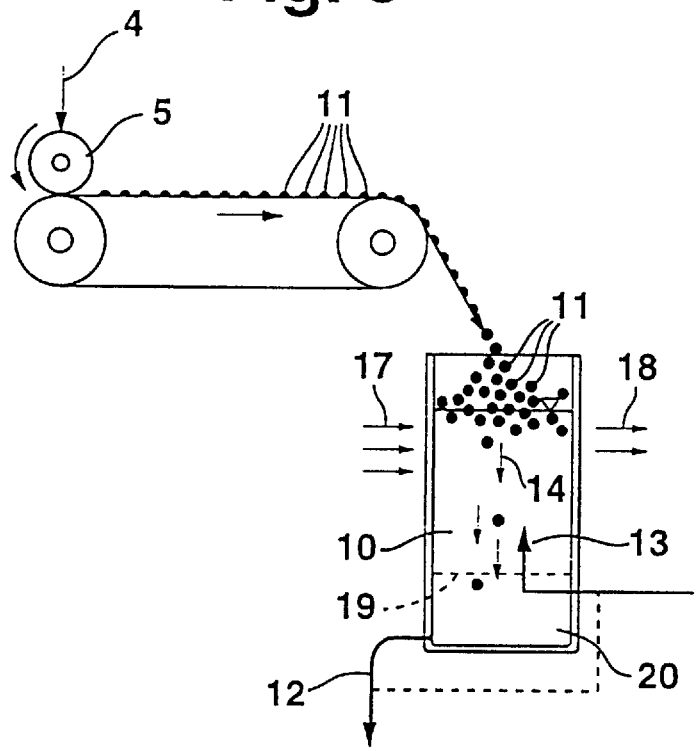
FIG. 3 shows a detail of the washing column provided in FIGS. 1 and 2, with a granulating device upstream.

FIG. 3, which depicts in more detail the washing column, again illustrates in detail that tablet-shaped particles (11) of identical size are first formed from the molten substance that is delivered through the conduit (4), and are then distributed largely uniformly over the cross section of the washing column (10) and moved in the direction of the arrow (14), the washing liquid being moved in countercurrent. It is moreover possible to deliver or remove heat to or from said washing column (10), as expressed by the arrows (17 and 18).

FIG. 3 also shows that a space occurs in the lowest region (20) of the washing column (10), which as a result of the operation of the washing column (10) fills up with tablets (11) that, because they have been moved in countercurrent, have had almost all contaminated residual molten substance removed. It is also evident that as the tablets (11) are delivered through the washing column (10), the following mass separation or exchange processes occur, leading to purification:

1. Melting of the not yet completely solidified particles (11) in the upper part of the washing column (10), and crystallization of pure substance in the lower region (20).
2. sweating, i.e. selective melting of the lower-melting contaminants that are deposited on the surface of the particles, and subsequent departure of these constituents due to the thermal effect.
3. Diffusion washing, i.e. diffusion of the liquid contaminants out of the interior of the particles (11) due to differences in concentration with respect to the purer washing liquid. This is an effect that depends on the residence time of the particles (11) in the washing liquid.

The new method and the apparatuses provided to implement it therefore open up, in a simple manner, an advantageous opportunity to use known devices (washing columns) for more efficient production.

Figure 4:
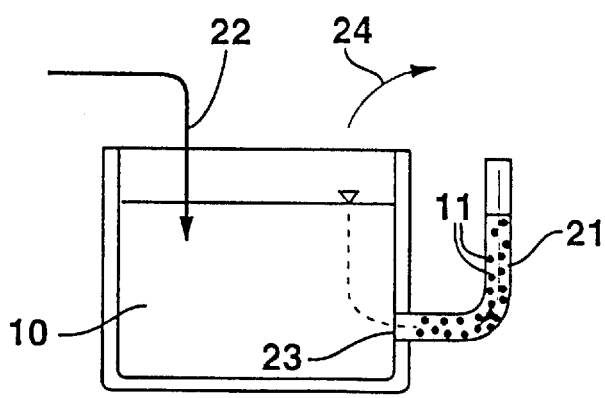
FIG. 4 shows a depiction similar to FIG. 3, but for a variant of the washing column.

Alternatively it would also be possible, as shown in FIG. 4, to send the tablets (11) coming from the belt (6) (not shown) not into the top of the washing column (10) but to deliver them laterally or from below through a delivery connector (21). This is especially so when the density of the tablets is less than that of the washing liquid, which in this case can even be delivered from a point (22) that lies higher than the delivery point (23) of the tablets (11), which can be removed once purified (or as a molten substance) in the direction of the arrow (24).

Figure 5:
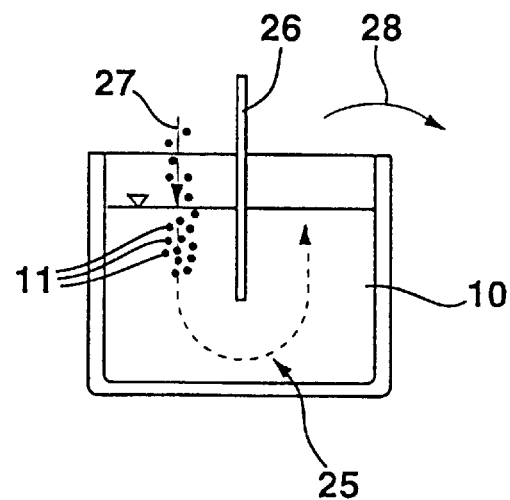
FIG. 5 shows a further variant of a washing column in a depiction according to FIG. 4.

In a further variant according to FIG. 5, it is also possible to move the tablets (11) (which arrive from the belt (6)) by means of positive conveyance (25) around a partition (26) inside the washing liquid, so they are, for example, added at the top at (27) and can also be removed at (28). Combinations of the flow patterns of FIGS. 4 and 5 with those of FIG. 1 to 3 are also possible.

In all embodiments, it is not necessary to melt the tablets completely. This also makes it possible, depending on circumstances, to perform only a surface purification of the tablets.

We claim:

1. A method for purifying a crystal-containing melt, comprising the steps of:
   A) forming the crystal-containing melt into particles of the same size and shape, wherein the particles are solidified on the outside but not completely solidified on the inside; and
   B) conducting said particles through a washing column.

2. The method according to claim 1, wherein the particles are engaged with a counter-flowing washing liquid in the washing column.

3. The method according to claim 1, wherein step B includes conducting some of the melt through the washing column.

4. The method according to claim 1 wherein step A comprises allowing the melt to drip onto a moving surface disposed therebelow and on which the drips become the particles.

5. A method of treating a molten chemical substance, comprising the steps of:
   A) subjecting the substance to a crystallization operation to form a crystal-containing melt;
   B) forming the crystal-containing melt into particles of the same size and shape, wherein the particles are solidified on the outside but not completely solidified on the inside; and
   C) conducting said particles through a washing column.

6. The method according to claim 5 wherein step B comprises allowing the melt to drip onto a moving surface disposed therebelow and on which the drips become the particles.

* * * * *